US012361035B1

(12) United States Patent
Christensen et al.

(10) Patent No.: US 12,361,035 B1
(45) Date of Patent: Jul. 15, 2025

(54) RANKING MODIFICATIONS OF A PREVIOUS QUERY

(71) Applicant: GOOGLE LLC, Mountain View, CA (US)

(72) Inventors: Bruce Christensen, Mountain View, CA (US); Pravir Kumar Gupta, Mountain View, CA (US); Jan Kuipers, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/635,878

(22) Filed: Apr. 15, 2024

Related U.S. Application Data

(63) Continuation of application No. 17/497,236, filed on Oct. 8, 2021, now Pat. No. 11,983,175, which is a continuation of application No. 14/882,091, filed on Oct. 13, 2015, now Pat. No. 11,169,989, which is a continuation of application No. 13/950,233, filed on Jul. 24, 2013, now Pat. No. 9,165,028.

(51) Int. Cl.
*G06F 16/242* (2019.01)
*G06F 16/2457* (2019.01)
*G06F 16/332* (2019.01)
*G06F 16/3332* (2025.01)
*G06F 16/9032* (2019.01)
*G06F 16/9538* (2019.01)

(52) U.S. Cl.
CPC ...... *G06F 16/3322* (2019.01); *G06F 16/2425* (2019.01); *G06F 16/24578* (2019.01); *G06F 16/3338* (2019.01); *G06F 16/90324* (2019.01); *G06F 16/9538* (2019.01)

(58) Field of Classification Search
CPC .......... G06F 16/2425; G06F 16/24578; G06F 16/3322; G06F 16/3338; G06F 16/90324; G06F 16/24534; G06F 16/9538
See application file for complete search history.

(56) References Cited

U.S. PATENT DOCUMENTS 8,380,502 B1 2/2013 Franz et al.
8,429,184 B2 4/2013 Ismalon
(Continued)

FOREIGN PATENT DOCUMENTS

WO 200142880 6/2001

OTHER PUBLICATIONS

Alluzen et al., "Voice Query Refinement," Interspeech 2012, 13th Annual Conference of the International Speech Communication Association, Portland, Oregon, pp. 1-4, Sep. 2012.

*Primary Examiner* — Marcin R Filipczyk
(74) *Attorney, Agent, or Firm* — Gray Ice Higdon

(57) ABSTRACT

Methods and apparatus related to ranking modifications of a previous query. For example, modifications of a previous query may be generated based on a current query issued subsequent to the previous query by substituting one or more n-grams of the previous query with one or more n-grams of the current query. One or more measures of each of the modifications may be identified and, based on such measures, a ranking of each of the modifications may be determined. One of the modifications may be selected as a submission query based on the rankings of the modifications. The submission query may be selected for submission in lieu of, or in addition to, the current query.

20 Claims, 5 Drawing Sheets

| | Candidate queries for previous query [weather tomorrow] and current query [how about on tuesday] | | |
|---|---|---|---|
| | **Substituted n-gram** | **Modification n-gram** | **Candidate query** |
| **1** | weather | tuesday | tuesday tomorrow |
| **2** | tomorrow | tuesday | weather tuesday |
| **3** | weather | on tuesday | on tuesday tomorrow |
| **4** | tomorrow | on tuesday | weather on tuesday |
| **5** | <none> | <none> | how about on tuesday |

(56) References Cited

U.S. PATENT DOCUMENTS

| | | | | |
|---|---|---|---|---|
| 8,990,085 | B2 | 3/2015 | Ljolje et al. | |
| 9,165,028 | B1 | 10/2015 | Christensen et al. | |
| 11,169,989 | B1 | 11/2021 | Christensen et al. | |
| 2003/0078914 | A1 | 4/2003 | Witbrock | |
| 2013/0006914 | A1 * | 1/2013 | Ray | G06F 16/9535 707/738 |
| 2014/0149399 | A1 | 5/2014 | Kurzion | |
| 2014/0188935 | A1 * | 7/2014 | Vee | G06Q 30/0241 707/771 |
| 2015/0120689 | A1 * | 4/2015 | Miao | G06F 16/951 707/706 |
| 2015/0294669 | A1 * | 10/2015 | Zhang | G10L 15/22 704/235 |

* cited by examiner

| | Modifications for previous query [songs by michael jackson] based on current query [what about janet] | | |
|---|---|---|---|
| | **Substituted n-gram** | **Modification n-gram** | **Modification** |
| **1** | songs | janet | janet by michael jackson |
| **2** | by | janet | songs janet michael jackson |
| **3** | michael | janet | songs by janet jackson |
| **4** | jackson | janet | songs by michael janet |
| **5** | songs by | janet | janet michael jackson |
| **6** | by michael | janet | songs janet jackson |
| **7** | michael jackson | janet | songs by janet |
| **8** | songs by michael | janet | janet jackson |
| **9** | by michael jackson | janet | songs janet |

FIG. 4

| | Candidate queries for previous query [weather tomorrow] and current query [how about on tuesday] | | |
|---|---|---|---|
| | **Substituted n-gram** | **Modification n-gram** | **Candidate query** |
| **1** | weather | tuesday | tuesday tomorrow |
| **2** | tomorrow | tuesday | weather tuesday |
| **3** | weather | on tuesday | on tuesday tomorrow |
| **4** | tomorrow | on tuesday | weather on tuesday |
| **5** | <none> | <none> | how about on tuesday |

FIG. 5A

| | **(substituted n-gram, modification n-gram)** | **Raw Category Score** | **Normalized Score** |
|---|---|---|---|
| **1** | (weather, tuesday) | 0.1 | 0.32 |
| **2** | (tomorrow, tuesday) | 0.2 | 0.64 |
| **3** | (weather, on tuesday) | 0.01 | 0.032 |
| **4** | (tomorrow, on tuesday) | 0.0001 | 0.00032 |
| **5** | (“”,””) | 0.0001 | 0.00032 |

FIG. 5B

| | |
|---|---|
| **Category Score** | 0.32 |
| **Related Concept Score** | 0.1 |
| **Prior Query Popularity Score** | 0.3 |
| **Query Pattern Popularity Score** | 0.2 |
| **Query Signals Score** | 0.001 |
| **Number Score** | 0 |
| **Overall Score** | $1.92*10^{-6}$ |

FIG. 5C

RANKING MODIFICATIONS OF A PREVIOUS QUERY

BACKGROUND

This specification is directed generally to ranking modifications of a previous query, such as modifications of a previous query that are based on a current query.

Internet search engines provide information about Internet accessible documents such as web pages, images, text documents, and/or multimedia content. A search engine may identify the documents in response to a user's search query that includes one or more search terms. The search engine ranks the documents based on the relevance of the documents to the query and the importance of the documents and provides search results that include aspects of and/or link to the identified documents. The user's search query may optionally be modified and such modified search query utilized in identifying one or more of the documents. For example, a misspelling in a search query may be corrected to create a modified search query and such modified search query utilized in identifying one or more of the documents. Also, for example, a term in a search query may be replaced with a synonym of that term to create a modified search query and such modified search query utilized in identifying one or more of the documents.

SUMMARY

The present disclosure is directed to methods and apparatus for ranking modifications of a previous query. For example, modifications of a previous query may be generated based on a current query issued subsequent to the previous query. For example, modifications of the previous query may be generated based on substituting one or more n-grams of the previous query with one or more n-grams of the current query. For example, the previous query may be [weather tomorrow] and the current query may be [how about on tuesday]. Modifications of the previous query may be generated by substituting the n-gram "tuesday" with each term of the previous query to form the modifications [tuesday tomorrow] and [weather tuesday]. Modifications of the previous query may additionally and/or alternatively be generated by substituting the n-gram "on tuesday" with each term of the previous query to form the modifications [on tuesday tomorrow], [weather on tuesday]. One or more measures of each of the modifications may be identified and, based on such measures, a ranking of each of the modifications may be determined. At least one of the modifications may be selected as a submission query based on the rankings of the modifications. The selected modification may be submitted in lieu of, or in addition to, the current query.

In some implementations a computer implemented method may be provided that includes the steps of: receiving a current query including a plurality of current query terms; determining, based on one or more of the current query terms, that the current query is indicative of an intent of the user to refine a query; determining a previous query associated with the current query, the previous query including a plurality of previous query terms and issued prior to the current query by at least one of a computing device and a user that issued the current query; determining a modification n-gram based on one or more of the current query terms; generating modifications of the previous query that each include the modification n-gram substituted for one or more of the previous query terms; identifying, for each modification of multiple of the modifications: a popularity measure and a related concept measure, wherein the popularity measure is indicative of the popularity of the modification and the related concept measure is indicative of a likelihood of co-occurrence, in one or more documents, of the modification n-gram and the one or more previous query terms replaced by the modification n-gram in the modification; determining a ranking for each of the multiple of the modifications, wherein the ranking of the modification is based on the popularity measure for the modification and the related concept measure of the modification; and selecting one modification of the modifications to utilize as a submission query when the ranking of the one modification is more prominent than at least the rankings of the other modifications.

This method and other implementations of technology disclosed herein may each optionally include one or more of the following features.

The method may further include submitting the one modification to a query system in place of the current query. The query system may be a search system, and the method may further include: determining search results responsive to the one modification; and providing the search results to the user.

The method may further include: determining, for at least a first modification of the modifications, a query pattern of the first modification; wherein the popularity measure for the first modification includes a query pattern popularity measure indicative of the popularity of the query pattern of the first modification. Determining the query pattern of the first modification may include: determining a category of an n-gram in the first modification; and substituting the n-gram with an identifier of the category.

In determining the ranking of each of the multiple of the modifications, the ranking of the modification may be boosted when the modification n-gram of the modification and the one or more previous query terms replaced by the modification n-gram in the modification are both indicative of geographic locations.

The method may further include: identifying a current query popularity measure indicative of the popularity of the current query based on previous queries; and determining a ranking for the current query based on the current query popularity measure, wherein selecting the one modification of the modifications to utilize as a submission query occurs only when the ranking of the one modification is also more prominent than the ranking for the current query. The method may further include: selecting the current query to utilize as the submission query when the ranking for the current query is more prominent than the rankings of the other modifications. The method may further include: applying a boost in determining the ranking of the current query, wherein the ranking of the current query relative to the modifications is promoted by the boost. The method may further include: utilizing a default measure for the current query for the related concept measure of the current query and determining the ranking for the current query based on the default measure.

The previous query and the current query may be provided via spoken input of the user. Determining the current query is indicative of a potential intent of the user to refine the previous query may be based on the previous query and the current being provided via spoken input of the user.

Determining the current query is indicative of a potential intent of the user to refine the previous query may be based on determining the current query includes one or more refinement intent n-grams.

The method may further include: determining a second modification n-gram based on one or more of the current query terms; generating additional modifications of the previous query that each include the second modification n-gram substituted for one or more of the previous query terms; identifying the popularity measure and the related concept measure for each of multiple of the additional modifications; and determining a ranking for each of the multiple of the additional modifications, wherein the ranking of each additional modification of the additional modifications is based on the popularity measure for the additional modification and the related concept measure of the additional modification; wherein selecting the one modification of the modifications to utilize as a submission query occurs only when the ranking of the one modification is also more prominent than the rankings of the additional modifications. The method may further include: determining that a matching one of the additional modifications includes the same terms in the same order as a matching one of the modifications; and determining a combined ranking of the matching one of the additional modifications and the matching one of the modifications, the combined ranking being more prominent than an individual ranking of either of the matching one of the additional modifications.

In some implementations a computer implemented method may be provided that includes the steps of: receiving a current query including a plurality of current query terms; determining, based on one or more of the current query terms, that the current query is indicative of an intent of the user to refine a query; determining a modification n-gram based on one or more of the current query terms; generating modifications of the previous query that each include the modification n-gram substituted for one or more of the previous query terms; determining candidate queries, the candidate queries including multiple of the generated modifications and including the current query; identifying, for each candidate query of the candidate queries: a popularity measure, wherein the popularity measure is indicative of the popularity of the candidate query based on previous queries; determining a ranking of each of the candidate queries, wherein the ranking of a given candidate query is based on the popularity measure for the given candidate query; and selecting one candidate query of the candidate queries to utilize as a submission query, the selecting based on the ranking of the one candidate query.

This method and other implementations of technology disclosed herein may each optionally include one or more of the following features.

The method may further include applying a boost in determining the ranking of the current query, wherein the ranking of the current query relative to the modifications is promoted by the boost.

The method may further include determining the ranking for each modification of the modifications of the candidate queries based on one or more measures indicative of a relationship between the modification n-gram of the modification and the previous query terms replaced by the modification n-gram in the modification. The method may further include determining the ranking of the current query based on one or more default measures provided for the current query in lieu of the one or more measures. The method may further include applying a boost in determining the ranking of the current query, wherein the ranking of the current query relative to the modifications is promoted by the boost.

Other implementations may include a non-transitory computer readable storage medium storing instructions executable by a processor to perform a method such as one or more of the methods described herein. Yet another implementation may include a system including memory and one or more processors operable to execute instructions, stored in the memory, to perform a method such as one or more of the methods described herein.

Particular implementations of the subject matter described herein generate modifications of a previous query based on a current query issued subsequent to the previous query. Such modifications represent new aspects of the previous query and may be utilized to determine a submission query to be submitted in lieu of, or in addition to, the current query. Particular implementations of the subject matter described herein determine rankings for generated modifications of a previous query based on a current query issued subsequent to the previous query, and/or determine a ranking for the current query. Such rankings represent new aspects of the modifications and/or of the current query and may be utilized to select at least one of the modifications and/or the current query to submit in response to the user issuing the current query.

It should be appreciated that all combinations of the foregoing concepts and additional concepts discussed in greater detail herein are contemplated as being part of the inventive subject matter disclosed herein. For example, all combinations of claimed subject matter appearing at the end of this disclosure are contemplated as being part of the inventive subject matter disclosed herein.

BRIEF DESCRIPTION OF THE DRAWINGS

FIG. 4 is a table utilized in describing examples of determining modifications for a previous query based on a current query issued subsequent to the previous query.

FIG. 5A is a table utilized in describing examples of determining candidate queries that include modifications for a previous query based on a current query issued subsequent to the previous query, and that also include the current query.

FIG. 5B is a table utilized in describing examples of determining a category score for each of the candidate queries of FIG. 5A.

FIG. 5C is an example table utilized in describing examples of determining an overall score for one of the modifications of FIG. 5A.

DETAILED DESCRIPTION

Figure 1:
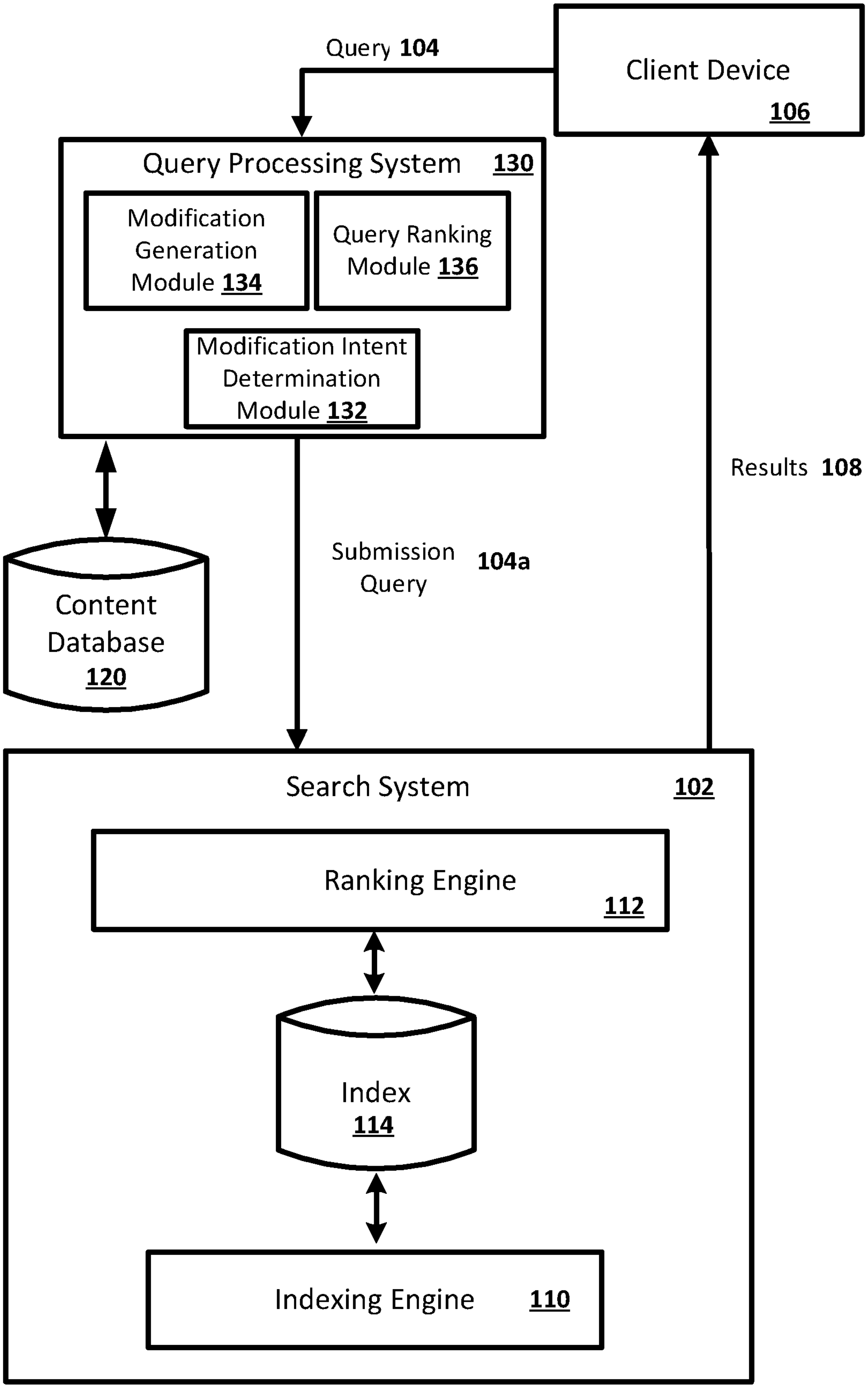
FIG. 1 illustrates an example environment in which modifications of a previous query may be generated based on a current query issued subsequent to the previous query; rankings of the modifications and/or the current query may be determined; and/or at least one of the modifications and/or the current query may be selected, based on the rankings, for submission in response to the current query.

The present disclosure is directed to methods and apparatus for ranking modifications of a previous query. Modifications of a previous query may be generated based on a current query issued subsequent to the previous query. For example, modifications of the previous query may be generated based on substituting one or more n-grams of the previous query with one or n-grams of the current query. For example, the previous query may be [weather tomorrow] and the current query may be [how about on tuesday]. Modifications of the previous query may be generated by substituting the n-gram "tuesday" with each term of the previous query to form the modifications [tuesday tomorrow] and [weather tuesday]. Modifications of the previous query may additionally and/or alternatively be generated by substituting the n-gram "on tuesday" with each term of the previous query to form the modifications [on tuesday tomorrow] and [weather on tuesday].

One or more measures of each of the modifications may be identified and, based on such measures, a ranking of each of the modifications may be determined. For example, for each modification, one or more of a prior query popularity measure, a query pattern popularity measure, a related concept measure, a category measure, an atomic concept measure, a location measure, and/or a synonym measure may be identified. Additional description of each of the aforementioned measures is provided herein. The ranking for each modification may be based on one or more of such measures and/or additional measures. At least one of the modifications may be selected as a submission query based on the ranking of the modification. For example, for a previous query of [weather tomorrow] and a current query [how about on tuesday], the modification [weather on tuesday] may be determined to be the highest ranked modification. Based on the modification [weather on tuesday] being the highest ranked modification, it may be issued in lieu of, or in addition to, the current query [how about on tuesday]. Thus, in implementations where the modification is issued to a search system, search results responsive to the modification [weather on tuesday] may be provided in response to the user issuing the current query [how about on Tuesday] subsequent to issuing the previous query [weather tomorrow].

In some implementations a ranking may also be determined for the current query to determine if the current query should be selected as the submission query instead of or in addition to a modification. For example, if the ranking of the current query is higher than the ranking of all of the modification queries, then the current query may be selected as the submission query and none of the modification queries will be utilized as the submission query. In some implementations the ranking of the current query may be based on one or more measures utilized in determining the rankings of the modifications. In some implementations the same measures may be utilized. In some implementations the ranking of the current query may be boosted by a factor to promote the ranking of the current query, thereby increasing the chance that a modification is utilized, either in lieu of or in addition to the current query, only when the user truly has modification intent.

FIG. 1 illustrates an example environment in which modifications of a previous query may be generated based on a current query issued subsequent to the previous query; rankings of the modifications and/or the current query may be determined; and at least one of the modifications and/or the current query may be selected, based on the rankings, for submission in response to the current query. The example environment includes a search system 102 for providing ranked search results relevant to submitted queries. The search system 102 can be implemented utilizing one or more computers that communicate, for example, through a network. The search system 102 is an example of an information retrieval system in which systems, components, and techniques described herein may be implemented and/or with which systems, components, and techniques described herein may interface.

The example environment also includes a query processing system 130. The query processing system 130 receives queries 104 from a client device 106, processes the queries 104, and provides submission queries **104*a* to the search system 102. Each query 104 is a request for information. The query 104 can be, for example, in a text form and/or in other forms such as, for example, audio form and/or image form. Other computer devices may submit search queries to the query processing system 130 and/or the search system 102 such as a server implementing a service for a website that has partnered with the provider of the search system 102. For brevity, however, the examples are described in the context of the client device 106. In some implementations the submission query 104*a* is the same as the query 104. For example, the query processing system 130 may determine that the query 104 does not need to be modified and may provide an unmodified version of the query 104 as submission query 104*a*. In some implementations the submission query 104*a* may be a modification of a previous query based on the query 104, as described in additional detail herein. While the query processing system 130 and the search system 102 are illustrated as two separate components in FIG. 1, in some implementations the query processing system 130 and the search system 102** may be combined.

The query processing system 130 may be implemented as, for example, computer programs running on one or more computers in one or more locations that are coupled to each other through a network. The query processing system 130 includes a modification intent determination module 132, a modification generation module 134, and a query ranking module 136. In some implementations the query processing system 130 may perform one or more of the steps of FIGS. 2 and 3. For example, in some implementations the modification intent determination module 132 may perform one or more of the steps of FIG. 2 such as step 200 and/or 205. Also, for example, in some implementations the modification generation module 134 may perform one or more of the steps of FIGS. 2 and 3 such as steps 205, 210, and/or 215 of FIG. 2 and/or step 305 of FIG. 3. Also, for example, in some implementations the query ranking module 136 may perform one or more of the steps of FIGS. 2 and 3 such as steps 220 and 225 of FIG. 2 and/or steps 300, 305, 310, and/or 315 of FIG. 3. In some implementations one or more of the modules 132, 134, and/or 136 may be combined and/or omitted. For example, in some implementations modification intent determination module 132 may be omitted.

The search system 102 receives submission queries **104*a* from the query processing system 130 and returns search results 108 to the client device 106 in response to the submission queries 104*a*. The client device 106 may be a computer coupled to the search system 102 through a network such as a local area network (LAN) or wide area network (WAN) such as the Internet. The client device 106 may be, for example, a desktop computing device, a laptop computing device, a tablet computing device, a mobile phone computing device, a tablet computing device, a computing device of a vehicle of the user (e.g., an in-vehicle communications system, an in-vehicle entertainment system, an in-vehicle navigation system), a wearable apparatus of the user that includes a computing device (e.g., a watch of the user having a computing device, glasses of the user having a computing device). Additional and/or alternative client devices may be provided. The client device 106 typically includes one or more applications to facilitate the sending and receiving of data over a network. The client device 106 and the search system 102 each include memory for storage of data and software applications, a processor for accessing data and executing applications, and components that facilitate communication over a network. The operations performed by the client device 106 and/or the search system 102 may be distributed across multiple computer systems. The search system 102** may be implemented as, for example, computer programs running on one or more computers in one or more locations that are coupled to each other through a network.

The search system 102 includes an indexing engine 110 and a ranking engine 112. The indexing engine 112 maintains an index 114 for use by the search system 102. The indexing engine 112 processes documents and updates index entries in the index 114, for example, using conventional and/or other indexing techniques.

A document is any data that is associated with a document address. Documents include HTML pages, word processing documents, portable document format (PDF) documents, images, video, and feed sources, to name just a few. The documents may include content such as, for example: words, phrases, pictures, etc.; embedded information (such as meta information and/or hyperlinks); and/or embedded instructions (such as JavaScript scripts).

The ranking engine 112 uses the index 114 to identify documents responsive to the submission query 104*a*, for example, using conventional and/or other information retrieval techniques. The ranking engine 112 calculates scores for the documents responsive to the query, for example, using one or more ranking signals. Each signal provides information about the document itself and/or the relationship between the document and the query. One example signal is a measure of the overall quality of the document. Another example signal is a measure of the number of times the terms of the query occur in the document. Additional and/or alternative signals can also be used.

The ranking engine 112 then ranks the responsive documents using the scores. For example, the responsive documents are ranked based on the scores. The search system 102 uses the documents identified and scored by the ranking engine 112 to generate search results 108. The search results 108 include results corresponding to documents responsive the submission query 104*a*. For example, search results 108 can include titles of each of the documents, links to each of the documents, and/or a summary of content from each of the documents that is responsive to the submission query 104*a*. For example, the summary of content may include a particular "snippet" or section of one or more documents that is responsive to the submission query 104*a*. Other examples of search results 108 include a summary of information responsive to the submission query 104*a* and/or an answer responsive to the submission query 104*a*. The summary and/or the answer can be generated from documents responsive to the submission query 104*a* and/or from other sources. The search results 108 are transmitted to the client device 106 in a form that may be provided to the user. For example, the search results 108 may be transmitted as a search results web page to be displayed on a browser running on the client device and/or as one or more search results conveyed to a user via audio.

The query processing system 130 receives queries 104 from the client device 106. For example, a user of the client device 106 may submit a query via typed input, spoken input, and/or other input. For a received current query 104 of the user, the query processing system 130 may determine if the current query is indicative of intent to refine a previous query associated with the current query. As described in more detail herein, a previous query associated with the current query is a previous query that is determined to have been submitted by the same user issuing the current query, that is determined to have been submitted by the same computing device issuing the current query, and/or that is determined to have been submitted by another computing device associated with the computing device issuing the current query. In some implementations the modification intent determination module 132 may determine whether the current query is indicative of intent to refine a previous query associated with the current query.

In some implementations, whether a current query indicates intent to refine a previous query submitted by the user may be determined based on one or more terms of the current query. For example, modification intent determination module 132 may determine the presence of one or more modification intent n-grams such as "what about", "how about", "make that", and/or "?" in the current query and determine whether the current query is indicative of intent to refine a previous query based on the presence of such modification intent n-grams. For example, if the current query contains the modification intent n-grams "what about", it may be determined to be indicative of intent to refine a previous query. In some implementations the positional arrangement of such one or more modification intent n-grams may be indicative of whether a current query indicates intent to refine a previous query submitted by the user. For example, modification intent determination module 132 may determine the position of one or more modification intent n-grams such as "what about", "how about", "make that", and/or "?" in the current query and determine that the current query is indicative of intent to refine a previous query based on the position of such n-grams. For example, the earlier that "what about" appears in a query, the more indicative it may be of intent to refine a previous query associated with the current query. Also, for example, if the current query contains the term "?" at the end of the query, it may be determined to be indicative of intent to refine a previous query associated with the current query.

In some implementations, whether a current query indicates intent to refine a previous query may be determined based on a query popularity measure of the current query that is indicative of the popularity of the current query based on previous query submissions. For example, if the popularity measure of the current query satisfies a popularity threshold indicative of the current query being a relatively popular query, modification intent determination module 132 may determine that the current query is not indicative of intent to refine a previous query. For example, the query "what about bob" may be a relatively popular query due in part to the 1991 movie "What About Bob". Accordingly, it may be the case that the popularity measure of such a query satisfies the popularity threshold and will be determined to be a query that is not indicative of intent to refine a previous query.

In some implementations, whether a current query indicates intent to refine a previous query submitted by the user may be determined based on one or more aspects of metadata optionally associated with the current query. For example, modification intent determination module 132 may determine the type of input utilized to submit the current query based on metadata of the current query. For example, metadata may indicate whether the current query was submitted via typed input or via spoken input and the modification intent determination module 132 may determine whether a current query is indicative of intent to refine a previous query based on the type of input. For example, a current query submitted via spoken input may be more indicative of intent to refine a previous query associated with the current query. Also, for example, a current query submitted via spoken input may include metadata indicating one or more properties of the spoken input, such as inflection of the spoken input, and the modification intent determination module 132 may determine whether a current query indicates the current query is indicative of intent to refine a previous query based on one or more of the properties. Also, for example, modification intent determination module 132 may determine the type of computing device utilized to submit the current query based on metadata of the current query. For example, metadata may indicate whether the current query was submitted via a desktop computing device, a laptop computing device, a tablet computing device, and/or a smart phone computing device, and the modification intent determination module 132 may determine whether a current query indicates the current query is indicative of intent to refine a previous query based on the type of computing device. For example, a current query submitted via a smart phone computing device may be more indicative of intent to refine a previous query associated with the current query than a query submitted via a desktop computing device.

In some implementations whether a current query indicates intent to refine a previous query submitted by the user may be determined based on comparison of the current query to the past query. For example, modification intent determination module 132 may determine one or more entity collections associated with the current query and compare the entity collections to one or more entity collections associated with the previous query. An entity collection is a grouping of entities that share one or more aspects in common. The modification intent determination module 132 may determine whether a current query indicates the current query is indicative of intent to refine a previous query based on the number of entity collections in common between the current query and the previous query. For example, the more entity collections in common, the more indicative the current query may be of intent to refine a previous query. As an example, the current query may be [battleship potemkin?] and the previous query may be [actors in the movie sunrise]. The current query may be associated with the entity collection "movie" based on the relation of the query to the entity associated with the 1925 film "Battleship Potemkin" and/or associated with the entity collection "1920's movies" based on the relation of the query to the same entity. Likewise, the previous query may also be associated with the entity collection "movie" based on the relation of the query to the entity associated with the 1928 film "Sunrise" and/or associated with the entity collection "1920's movies" based on the relation of the query to the same entity. Modification intent determination module 132 may determine that the current query is indicative of intent to refine the previous query based at least in part on such common entities between the two queries.

In some implementations modification intent determination module 132 may take multiple factors into account in determining whether the current query is indicative of intent to refine a previous query associated with the current query, such as one or more factors discussed herein and/or additional or alternative factors. In some implementations only a single factor may be taken into account. In some implementations, modifications of a previous query based on the current query are generated only when the current query is indicative of intent to refine a previous query. In some implementations the modification intent determination module 132 may be omitted and each current query may be assumed to be potentially indicative of intent to modify a previous query.

The query processing system 130 may further determine a previous query associated with the current query and utilize the current query to generate multiple modifications of the previous query. In some implementations the modification generation module 134 may determine the previous query associated with the current query and/or generate multiple modifications of the previous query based on the current query.

A previous query associated with the current query may be determined by the modification generation module 134 based on, for example, determining that both queries have been submitted by the same user, that both queries have been submitted by the same computing device issuing the current query, and/or that the previous query was submitted by another computing device associated with the computing device issuing the current query. Association of one or more queries with a user may be based on, for example, data submitted with and/or included with a query such as a cookie, a user identification, and so forth. Association of one or more queries with a computing device may be based on, for example, data submitted with and/or included with a query such as an IP address of the computing device, a MAC address of the computing device, a cookie, and so forth. Associations between two or more computing devices may be based on, for example, associations of each of the computing devices to a common user, associations of each of the computing devices to a common IP address (e.g., associated with a router accessed by both computing devices), and so forth.

Previous queries and associations of the previous queries to a user and/or a computing device may be determined by the modification generation module 134 via, for example, accessing a record of previously submitted queries of the user. In some implementations the query processing system 130 may maintain previous queries in local memory and access the previous queries from the local memory. In some implementations the query processing system 130 may maintain and/or access a database such as content database 120 that includes previous queries associated with one or more users and/or computing devices to determine a previously submitted query of the user. In some implementations data submitted with and/or included with a current query may identify the previous query. For example, a current query issued via a computing device may include data indicating the immediately preceding query issued via the computing device and/or data indicating multiple preceding queries issued via the computing device. For example, a cookie submitted with the current query may contain data related to a previous query and may be utilized to determine the previous query.

In some implementations a previous query may be determined based on satisfaction of a query freshness threshold by the previous query relative to the current query. For example, the query freshness threshold may be an amount of time between the submission of the previous query and the submission of the current query. For example, in some implementations a previous query must be a query that was submitted within X seconds of the current query. Also, for example, the query freshness threshold may be an amount of queries submitted between the previous query and the current query. For example, in some implementations a previous query must be a query that was submitted by a user and/or a computing device immediately preceding the submission of the current query. Also, for example, in some implementations a previous query must be a query that was submitted by a user and/or a computing device and is the first query preceding submission of the current query that itself does not indicate intent to refine a previous query. For example, the following sequence of queries may be submitted in the following order: [rain chances for today], [how about tuesday], [how about wednesday]. The query [how about wednesday] is the current query and the query [rain chances for today] may be determined to be the previous query since it is the first query preceding the current query that itself does not indicate intent to refine a previous query. In other words, since [how about tuesday] may be determined to be a query indicative of intent to refine a previous query, it may not be selected as a previous query and, instead, the query issued two queries before the current query may be determined to be the previous query.

Based on the previous query and the current query, the modification generation module 134 may generate multiple modifications of the previous query. Each modification of the previous query includes one or more modification n-grams of the current query substituted for one or more n-grams of the previous query. Each modification n-gram includes one or more terms from the current query. In some implementations the modification generation module 132 may determine the modification n-gram by determining those terms of the query that are not part of a modification intent n-gram. For example, for a query [what about flowers], the term "flowers" may be determined to be the modification n-gram since it is the only term of the query that is not part of the modification intent n-gram "what about". Also, for example, for a query [how about to san jose], the n-gram "to san jose" may be determined to be the modification n-gram since it is the only term of the query that is not part of the modification intent n-gram "how about".

In some implementations one or more stop words may optionally be omitted in determining a modification n-gram. Stop words may include articles such as "a", "an", and "the"; prepositions such as "of," "to", and "for"; conjunctions such as "and"; auxiliary verbs such as "have" and "were"; and/or other defined words. For example, for the query [how about to san jose], the stop word "to" may be omitted to determine a modification n-gram of "san jose". Also, for example, for the query [what about to the park], the stop words "about" and "to" may be omitted to determine a modification n-gram of "park". In some implementations a first modification n-gram may be determined that includes a stop word and an additional modification n-gram may be determined that omits the stop word. For example, for the query [how about to san jose], the first modification n-gram may be determined to be "to san jose" and the second modification n-gram may be determined to be "san jose".

In some implementations one or more aspects of a query may be normalized in determining a modification n-gram. For example, capitalized letters may be converted to lower case. For example, for the query [how about to San Jose], the n-gram "San Jose" may be converted to "san jose" to determine a modification n-gram of "to san jose". Also, for example, whitespace sequences may be converted to single space characters. For example, for the query [how about to san jose], the white space between "to" and "san" may be reduced to a single space to determine a modification n-gram of "to san jose". Also, for example, certain punctuation may be removed, such as leading and/or trailing punctuation of an n-gram. For example, for the query [how about to san jose?], the "?" may be removed to determine a modification n-gram of "to san jose". In some implementations internal punctuation such as the apostrophe in "bush's" may be retained.

In some implementations modifications of a previous query are generated for each modification n-gram by substituting each n-gram of the previous query, except the n-gram spanning the entire query, with the modification n-gram. In some implementations the number of n-grams of the previous query that are substituted may be fewer than each n-gram of the previous query that doesn't span the entire previous query. For example, in some implementations the number of n-grams may be limited by a threshold. For example, in some implementations a threshold of n-grams may be defined and only a number of n-grams below that threshold will be substituted with the modification n-gram. In some implementations where less than all n-grams of the previous query are substituted by the modification n-gram to generate modifications, shorter n-grams may be prioritized for substitution over longer n-grams.

With reference to FIG. 4, a table is illustrated of modifications of a previous query [songs by michael jackson] based on a current query [what about janet]. A modification n-gram "janet" (rows 1-9) is determined based on the current query [what about janet]. For example, the modification generation module 134 may determine the modification n-gram "janet" based on determining the term of the query [what about janet] that is not part of the modification intent n-gram "what about". The modifications of the rightmost column of FIG. 4 are generated by substituting the indicated substituted n-gram of the previous query [songs by michael jackson] with the indicated modification term. For example, in row 1 the n-gram "songs" of the previous query is substituted with the modification term "janet" to generate the modification "janet by michael jackson". As illustrated, nine total modifications are generated.

The query processing system 130 may further determine a ranking for each of one or more of the generated modifications and, optionally, may also determine a ranking for the current query. The one or more generated modifications and optionally the current query for which rankings are determined may be collectively referred to herein as "candidate queries". For example, in implementations in which rankings are determined for all generated modifications and for the current query, all such modifications and the current query may form the candidate queries. In some implementations each ranking of a candidate query is based on one or more of a prior query popularity measure, a query pattern popularity measure, a related concept measure, a category measure, an atomic concept measure, a location measure, and/or a synonym measure. In some implementations one or more utilized measures may be identified from one or more databases, such as content database 120. For example, content database 120 may include a record of past queries and, for each past query, indications of one or more measures of the past query. In some implementations one or more utilized measures for a query may be identified via a query annotation server to which the query has been provided for annotating with such measures. In some implementations one or more utilized measures may be determined, in whole or in part, by the query processing system 130. In some implementations each ranking of a candidate query is based on a score for the query determined based on one or more of such measures. In some implementations the query ranking module 136 may determine a ranking for each of the candidate queries.

In some implementations the query ranking module 136 may determine a ranking for a modification and/or the current query based on a prior query popularity measure of such a candidate query. The prior query popularity measure of a candidate query may be based on, for example, the popularity of the candidate query in previous query submissions. For example, the prior query popularity measure of a candidate query may be based on the submission rate of the candidate query in a record of past queries issued by a plurality of users. For example, the query [where to buy dvds] may be expected to have a prior query popularity measure more indicative of popularity than the somewhat obscure query [where to buy lollipops with green and white stripes]. In some implementations the prior query popularity measure may be a normalized score. For example, in some implementations the prior query popularity measure may be a normalized score between zero and one.

In some implementations a prior query popularity measure floor value may be set for a query for which measures are not available and/or for a query having an actual prior query popularity measure that is less indicative of popularity than the floor value. For example, in implementations where the prior query popularity measure is a score and a lower score is less indicative of popularity, a query having a prior query popularity score lower than a floor value may instead be associated with the floor value. In some of those implementations the floor value may be set to a very low value to bias overall rankings toward queries that have a high prior query popularity measure. In some implementations the floor value may be set based on prior query popularity scores of other of the candidate queries. For example, the floor value may be a magnitude lower than the second lowest prior query popularity score of all of the modifications and/or the current query.

In some implementations the query ranking module 136 determines a ranking for a modification and/or the current query based on a query pattern popularity measure of such a candidate query. The query pattern popularity measure of a candidate query may be based on, for example, the popularity of a plurality of queries conforming to one or more query patterns of the candidate query in previous query submissions. In some implementations a query pattern of a candidate query may be determined by determining a category of an n-gram of the candidate query and substituting the n-gram with an identifier of the category. For example, for the query [recipes for broccoli], the n-gram "broccoli" may be substituted with the category "food" to which "broccoli" belongs. Thus, a query pattern [recipes for <food>] may be determined. Also, for example, for the query [recipes for broccoli], the n-gram "broccoli" may be substituted with the category "vegetable" to which "broccoli" also belongs. Thus, a query pattern of [recipes for <vegetable>] may be determined. A popularity of queries conforming to one or more of such query templates may be determined and utilized as the query pattern popularity measure. For example, the query pattern popularity measure for the query [recipes for broccoli] may be based on a popularity measure for a plurality of queries conforming to the query pattern [recipes for <food>](e.g., [recipes for lasagna], [recipes for bread]). Also, for example, the query pattern popularity measure for the query [recipes for broccoli] may be based on a popularity measure for a plurality of queries conforming to the query pattern [recipes for <food>] and the popularity measure for a plurality of queries conforming to the query pattern [recipes for <vegetable>].

In some implementations the query pattern popularity measure may be a normalized score. For example, in some implementations the query pattern popularity measure may be a normalized score between zero and one. In some implementations a query pattern popularity measure floor value may be set for a query for which measures are not available and/or for a query having an actual query pattern popularity measure that is less indicative of popularity than the floor value. For example, a floor value may be set in a similar manner as described with respect to the prior query popularity measure.

In some implementations the query ranking module 136 determines a ranking for a modification and/or the current query based on a related concept measure of such a query. The related concept measure of a modification is generally indicative of a likelihood of co-occurrence, in one or more documents, of the modification n-gram of the modification and the one or more terms of the previous query that were replaced by the modification n-gram to generate the modification. For example, with reference to FIG. 4, the modification n-gram of the modification [janet by michael jackson] of row 1 is "janet" and the one or more terms of the previous query that were replaced by the modification n-gram to generate the modification is the n-gram "songs". Accordingly, for the modification of row 1, the related concept measure of the modification is indicative of likelihood of co-occurrence of the n-gram pair ("songs", "janet"). The related concept measure may be determined utilizing one or more of various techniques to determine co-occurrence between n-gram pairs. For example, a corpus of documents may be analyzed to determine a co-occurrence rate of each of a plurality of n-gram pairs in the corpus of documents. In some implementations the co-occurrence rate of an n-gram pair may be based on the rate of the n-gram pair occurring together in one or more single document of the corpus of documents (e.g., a single document contains both n-grams of the pair) and/or the rate of each n-gram of the n-gram pair across multiple documents of the corpus of documents (e.g., first n-gram of the pair occurs X times across all documents of the corpus and second n-gram of the pair occurs Y times across all documents of the corpus).

As an example, the n-gram pair ("car", "truck") may have a related concept measure that is more indicative of likelihood of co-occurrence than the related concept measure of the n-gram pair ("knitting", "truck"). For example, the n-gram pair ("car", "truck") may co-occur with one another in each of multiple documents with relatively high frequency, whereas the n-gram pair ("knitting", "truck") may co-occur with one another in each of multiple documents with relatively low frequency and/or not at all.

In some implementations the related concept measure may be a normalized score. For example, in some implementations the related concept measure may be a normalized score between zero and one. In some implementations a related concept measure floor value may be set for a query for which measures are not available and/or for a query having an actual related concept measure that is less indicative of popularity than the floor value. For example, a floor value may be set in a similar manner as described with respect to the prior query popularity measure.

In implementations in which a ranking is determined for the current query based on a related concept measure, a default related concept measure may be utilized for the current query since the current query does not have a modification n-gram and one or more terms replaced by the modification n-gram. In some implementations the default related concept measure may be a fixed value. In some implementations the default related concept measure may be the related concept measure floor value discussed above. In some implementations the default related concept measure may be based on one or more factors such as the related concept measures of one or more of the modifications. For example, in some implementations the default related concept measure may be determined such that it is representative of less indicativeness of likelihood of co-occurrence than the related concept measures of all other of the modifications, or may be determined such that it is representative of less indicativeness of likelihood of co-occurrence than the related concept measures of an average of the related concept measure of all other of the modifications.

In some implementations the query ranking module 136 determines a ranking for a modification and/or the current query based on category measures associated with such a candidate query. The category measures of a modification may include one or more modification n-gram categories to which the modification n-gram of the modification belongs and one or more previous query n-gram categories to which the one or more terms of the previous query that were replaced by the modification n-gram belong. A category of an n-gram is a class to which the n-gram belongs. For example, for an n-gram "red", the category measures may include n-gram categories of "color", "hue", and "wine". In some implementations the category measures may also include an indication of the ranking of each of the n-gram categories. For example, for an n-gram "red", the category measures may include scored n-gram categories of "color" and "wine" and the scores may indicate "red" is more likely to belong to the category "color" than to the category "wine".

In some implementations the query ranking module 136 may identify one or more categories and/or category rankings for an n-gram by accessing a database, such as content database 120, having "is-a" relationship data for each of a plurality of n-grams. In some implementations the database may be an entity database such as a knowledge graph. An entity database may include, for example, mappings between a plurality of entities. For example, for each of a plurality of entities, a mapping (e.g., data defining an association) between the entity and other entities related with the entity may be identified in the entity database. In some implementations, entities are topics of discourse. In some implementations, entities are persons, places, concepts, and/or things that can be referred to by a text fragment (e.g., a term or phrase) and are distinguishable from one another (e.g., based on context). For example, the entity associated with the n-gram "red" may be mapped to one or more entities associated with categories of which the entity is a member such as, for example, an entity associated with the property of "color" and an entity associated with the drink "wine".

A category score for a modification may be determined based on the category measures. In some implementations the category score for a modification is based on the similarity and/or dissimilarity between the modification n-gram categories and the previous query n-gram categories. For example, a category score may become more indicative of similarity as the number of common categories between the modification n-gram categories and the previous query n-gram categories increase and/or as the number of non-common categories between the modification n-gram categories and the previous query n-gram categories decreases. In implementations in which category rankings are also provided for the categories, the category score for a modification may also be based on such category rankings. For example, a category score may become more indicative of similarity as the rankings of common categories between the modification n-gram categories and the previous query n-gram categories increase and/or as the rankings of non-common categories between the modification n-gram categories and the previous query n-gram categories decreases.

In some implementations the category score may be determined based on a cosine distance between a vector of scores for the modification n-gram categories and a vector of scores for the previous query n-gram categories. For example, modification n-gram categories and scores may include: categories A, B, and C with respective scores of 0.5, 0.6, and 0.7; and previous query n-gram categories and scores may include: categories B, C, and D with respective scores of 0.3, 0.2, and 0.1. The category score may be determined based on a cosine distance between vectors [0.5, 0.6, 0.7, 0] and [0, 0.3, 0.2, 0.1]. In some implementations a determined category score for a modification may be normalized based on determined category scores for all other of the modifications. For example, in some implementations the determined category score may be a normalized score between zero and one.

In some implementations a category score floor value may be set for a candidate query for which measures are not available and/or for a query having an actual category score that is less indicative of similarity between the n-gram categories than the floor value. For example, a floor value may be set in a similar manner as described with respect to the prior query popularity measure.

In implementations in which a ranking is determined for the current query based on a category measure, a default category score may be utilized for the current query since the current query does not have a modification n-gram and one or more terms replaced by the modification n-gram. In some implementations the default category score may be a fixed value. In some implementations the default category score may be the category score floor value discussed above. In some implementations the default category score may be based on one or more factors such as the category measures of one or more of the modifications.

In some implementations the query ranking module 136 may determine a ranking for a modification based on an atomic concept measure associated with the modification. An atomic concept measure indicates n-grams of the previous query that are likely to be a single, indivisible concept. For example, for the query [empire state building in new york], "empire state building" and "new york" may each be indicated as a likely single, indivisible concept within the query. In some implementations an n-gram may be indicated by the atomic concept measure with a binary indication as to whether it is a single, indivisible concept within the query. In some implementations an n-gram may be indicated by the atomic concept measure with a score indicative of a level of confidence that the n-gram is a single, indivisible concept within the query.

In some implementations a ranking of a modification may be penalized if the atomic concept measure indicates the terms of the previous query that were substituted by the modification n-gram formed less than the entirety of a single, indivisible concept within the previous query. For example, for the query [empire state building in new york], "empire state building" and "new york" may each be indicated as a likely single, indivisible concept within the query. A modification in which only "new" is substituted with a modification n-gram may cause the ranking of the modification to be penalized because the term "new" formed less than the entirety of a single, indivisible concept within the previous query. On the other hand, a modification in which only "new york" or only "in" is substituted with a modification n-gram will not cause the ranking of the modification to be penalized because the term "new york" forms the entirety of the single, indivisible concept and the term "in" does not form a part of a single, indivisible concept. In implementations where an n-gram is indicated by the atomic concept measure with a score indicative of a level of confidence that the n-gram is a single, indivisible concept within the query, the degree of penalty may optionally be based on the level of confidence. In some implementations the degree of penalty may be based on the number of single, indivisible concepts destroyed by a substitution. For example, continuing with the previous example, a modification in which only "building in new" is substituted with a modification n-gram may cause the ranking of the modification to be penalized more than if only "new" were substituted because the n-gram "building in new" formed part of two indivisible concepts, whereas "new" formed part of only one indivisible concept.

In some implementations the query ranking module 136 may determine a ranking for a modification based on a location measure associated with the modification n-gram and a location measure associated with the one or more terms of the previous query substituted by the modification n-gram. A location measure indicates whether an n-gram is likely to be a geographic location such as the n-grams "new york", "boston", "united states", and so forth. In some implementations a location measure of an n-gram may be a binary indication as to whether it is a geographic location. In some implementations a location measure of an n-gram may be a score indicative of a level of confidence that the n-gram is a geographic location. In some implementations a ranking of a modification may be penalized if the location measures indicate the n-gram of the previous query that was substituted by the modification n-gram was a geographic location and the modification n-gram was not a geographic location, or vice-versa. In some implementations a ranking of a modification may be boosted if the location measures indicate the n-gram of the previous query that was substituted by the modification n-gram was a geographic location and the modification n-gram was also a geographic location.

In some implementations the query ranking module 136 determines a ranking for a modification based on a synonym measure associated with the modification n-gram and the one or more terms of the previous query substituted by the modification n-gram. The synonym measure indicates whether the modification n-gram and the one or more terms of the previous query n-gram substituted by the modification n-gram share one or more synonyms. In some implementations a synonym measure of an n-gram pair may be a binary indication as to whether they share one or more synonyms. In some implementations a synonym measure of an n-gram pair may be a score indicative of a level of confidence that they share one or more synonyms, indicative of how many synonyms they share, and/or how many non-synonyms they also share. In some implementations a ranking of a modification may be boosted if the synonym measure indicates the n-gram of the previous query that was substituted by the modification n-gram shares one or more synonyms with the modification n-gram. In implementations where an n-gram is indicated by the synonym measure with a score indicative of a level of confidence that they share one or more synonyms, indicative of how many synonyms they share, and/or how many non-synonyms they also share, the degree of boosting may optionally be based on the level of confidence. In some implementations the degree of boosting may be based on the number of shared synonyms.

Based on the one or more of the mentioned measures and/or additional measures, the query ranking module 136 may determine an overall score for each of the candidate queries. In some implementations, the overall ranking of a candidate query is based on one or more sub-scores such as: a prior query popularity score, a query pattern popularity score, a related concept score, a category score, a query signals score, and/or a number score.

As discussed herein, the prior query popularity score for each query may be based on the prior query popularity measure for the query. For example, in some implementations the prior query popularity measure may be a normalized score between zero and one. The ranking module 136 may determine a prior query popularity score based on such normalized score. In some implementations the prior query popularity score may be the prior query popularity measure.

Also, as discussed herein, the query pattern popularity score for each query may be based on the query pattern popularity measure for the query. For example, as described herein, in some implementations the query pattern popularity measure may be a normalized score between zero and one. The ranking module 136 may determine a popularity score based on such normalized score. In some implementations the query pattern popularity score may be the query pattern popularity measure.

Also, as discussed herein, the related concept score for each query may be based on the related concept measure. For example, as described herein, the related concept measure may be a normalized score. For example, in some implementations the related concept measure may be a normalized score between zero and one. In some implementations the related concept measure may be the related concept score.

Also, as discussed herein, the category score for a modification may be determined based on the category measures. In some implementations the category score for a modification is based on the similarity and/or dissimilarity between the modification n-gram categories and the query n-gram categories. In some implementations the category score may be a normalized score such as a normalized score between zero and one. For example, the category score may be determined based on a cosine distance between a vector of scores for the modification n-gram categories and a vector of scores for the query n-gram categories.

The query signals score may be based on one or more determinations made via the atomic concept measure, the synonyms measure, and/or the location measure, such as those discussed herein. For example, the query signals score for a modification may be positively influenced when a location modification n-gram is substituted for a location n-gram of the previous query in the modification. Also, for example, the query signals score for a modification may be negatively influenced when a location modification n-gram is substituted for a non-location n-gram of the previous query in the modification, or vice versa. Also, for example, the query signals score for a modification may be positively influenced when a modification n-gram contains one or more synonyms with the n-gram of the previous query for which the modification n-gram is substituted in generating the modification. In some implementations the query signals score may be a normalized score such as a normalized score between zero and one.

The number score may be zero or some other value when neither the modification n-gram nor the n-gram of the previous query for which the modification n-gram is substituted contains a numerical n-gram (e.g., “2”, “two”). When only one of the modification n-gram or the n-gram of the previous query for which the modification n-gram is substituted contains a numerical n-gram, the number score may be a very low value such as 0.001. When both the modification n-gram and the n-gram of the previous query for which the modification n-gram is substituted contain a numerical n-gram, the number score may be a higher value that is based on the numerical closeness of the numerical n-grams to one another. For example, when the modification n-gram is “2” and the n-gram of the previous query for which the modification n-gram is substituted is “3”, the number score may be higher than when the modification n-gram is “2” and the n-gram of the previous query is “100”. In some implementations the number score may be a normalized score such as a normalized score between zero and one.

As discussed herein, a related concept score, a category score, a query signals score, and/or a number score based on actual measures of the current query may not be obtained for the current query. However, one or more default scores for each of such sub-scores may be utilized for the current query. Accordingly, a related concept score, a category score, a query signals score, and/or a number score may likewise be determined for the current query.

Once the sub-scores for each modification, and optionally for the current query, have been determined, an overall score for each candidate query may be determined. In some implementations, each of the sub-scores may be normalized across all candidate queries prior to determining the overall score. For example, all of the popularity scores for the candidate queries may be normalized so that the normalized popularity scores sum to one. In the cases where all scores for one of the sub-scores is zero, such scores may be normalized to a uniform distribution. For example, if all of the number scores are zero, they may be normalized to a uniform distribution.

In some implementations the overall score for a candidate query is based on combining all of the sub-scores for that candidate query. For example, the overall score for a modification may be based on multiplying all of the sub-scores together for that modification. In some implementations additional and/or alternative techniques for combining the sub-scores may be utilized. For example, a sum, a weighted average, a linear combination, and/or the P-mean of one or more of the sub-scores may be utilized. In some implementations, a boost is applied to the overall score of the current query. For example, in some implementations the overall score of the current query may be multiplied by two. An additional and/or alternative boost may be utilized, such as a boost implemented by demoting the overall scores of the modifications of the candidate queries. Such a boost may promote the score of the current query, thereby increasing the chance that a modification is utilized, either in lieu of or in addition to the current query, only when the user truly has modification intent.

In some implementations in which multiple modification n-grams are utilized in generating modifications, it may be the situation that two or more modifications are the same modifications, but are formed utilizing different modification n-gram, substituted n-gram pairs. For example, for a previous query [songs by michael jackson] and a current query of [what about by janet], a first modification [songs by janet] may be formed by substituting “michael jackson” with the modification n-gram “janet”. A second modification [songs by janet] may be formed by substituting “by michael jackson” with the modification n-gram “by janet”. In some of those implementations sub-scores may be determined for each of the matching modifications individually and the sub-scores from each of the matching modifications combined prior to determining a single overall score for both of the modifications. For example, the sub-scores may be summed, averaged, and/or otherwise combined. As an example, the category score for the first modification [songs by janet] may be 0.2 and the category score for the second modification [songs by janet] may be 0.1. Those category scores may be combined (e.g., summed to form 0.3). Combined sub-scores from matching modifications may be utilized to form a single overall score for the matching modification.

When all overall scores have been determined, the candidate query with the highest score may be selected to be utilized as a submission query such as submission query 104*a*. For example, if the current query is the query with the highest score, it may be selected as a submission query. Also, for example, if one of the modifications is the query with the highest score, it may be selected as a submission query.

In some implementations the candidate query selected as the submission query may be submitted to the search system 102 and search results 108 provided by the search system 102 based on the submission query. The search results 108 may optionally be provided with an indication that they are based on the submission query. In some implementations only the highest ranked candidate query is submitted to the search system 102. In some implementations multiple of the highest ranked candidate queries may be submitted to the search system 102 and search results 108 provided based on the multiple queries. For example, in some implementations the two highest ranked queries may both be submitted if the score between the two queries is less than a threshold. In some implementations multiple of the highest ranked candidate queries may optionally be submitted as a single disjunctive search query. In some implementations, when the candidate query selected as a submission query is a modification query, both that query and the current query may be submitted to the search system 102 and search results 108 provided based on the multiple queries. For example, in some implementations both a highest ranked modification query and the current query may be submitted if the difference in the score between the modification query and the current query is less than a threshold.

In some implementations in which multiple of the highest ranked candidate queries are submitted to the search system 102, the search results 108 provided may be a combination of search results responsive to each of the queries. For example, a first candidate query and a second candidate query may be submitted and the search results 108 may include search results responsive to the first candidate query and search results responsive to the second candidate query. In some other implementations in which multiple of the highest ranked candidate queries are submitted to the search system 102, the search results 108 provided may be search results responsive to only one of the queries. For example, a first candidate query and a second candidate query may be submitted and the search results 108 may include search results responsive to only one of the first candidate query and the second candidate query. For example, only the search results responsive to the first candidate query may be provided if quality of such search results is determined to be more indicative of quality than the search results responsive to the second candidate query.

In some implementations, an association between the submission query, the previous query, and the current query may be stored in a database such as content database 120. Storing of associations between the submission query, the previous query, and the current query may enable future selection of the submission query in response to a user issuing a previous query followed by the current query, without necessitating generating of modifications and ranking of candidate queries as described herein.

With reference to FIGS. 5A-5C, an example of some aspects of scoring candidate queries is provided. In FIG. 5A, a table is illustrated of candidate queries for a previous query [weather tomorrow] based on a current query [how about on tuesday]. Two modification n-grams, "tuesday" and "on tuesday" are determined based on the current query [how about on tuesday]. The candidate queries of the rightmost column of FIG. 5A include the candidate modifications of rows 1 through 4 generated by substituting the indicated substituted n-gram of the previous query [weather tomorrow] of the previous query with the indicated modification n-gram. The candidate queries also include the current query [how about on tuesday] in row 5. As illustrated, the current query does not have any substituted n-gram and does not have a modification n-gram.

In FIG. 5B, the substituted n-gram, modification n-gram pairs of FIG. 5A are illustrated in the first column. For example, in row 1 the n-gram, modification n-gram pair (weather, tuesday) of the modification [tuesday tomorrow] is illustrated. As illustrated in row 5, the current query does not have an n-gram, modification n-gram pair. Raw category scores for each of the n-gram, modification n-gram pairs are illustrated in the middle column. For example, in row 1 the raw category score is 0.1. Raw category scores may be determined, for example, utilizing one or more techniques discussed herein. For example, as discussed herein, the raw category score for the current query, as illustrated in row 5, may be based on a category score floor value. Normalized scores for each of the n-gram, modification n-gram pairs are illustrated in the rightmost column and may be determined based on the raw category score. For example, in row 1 the normalized category score is 0.32.

In FIG. 5C, example sub-scores for the candidate query [tuesday tomorrow] are illustrated. For example, FIG. 5C includes the normalized category score of FIG. 5B for the candidate query [tuesday tomorrow]. An overall final score of $1.92*10^{-6}$ is also illustrated in the last row of FIG. 5C. In the example of FIG. 5C the overall score is the product of all non-zero sub-scores. In particular, the overall score of FIG. 5C is the product of the category score, the related concepts score, the popularity score, the query pattern score, and the query signals score.

Many other configurations are possible having more or fewer components than the environment shown in FIG. 1. For example, in some environments the search system 102 may be omitted.

Figure 2:
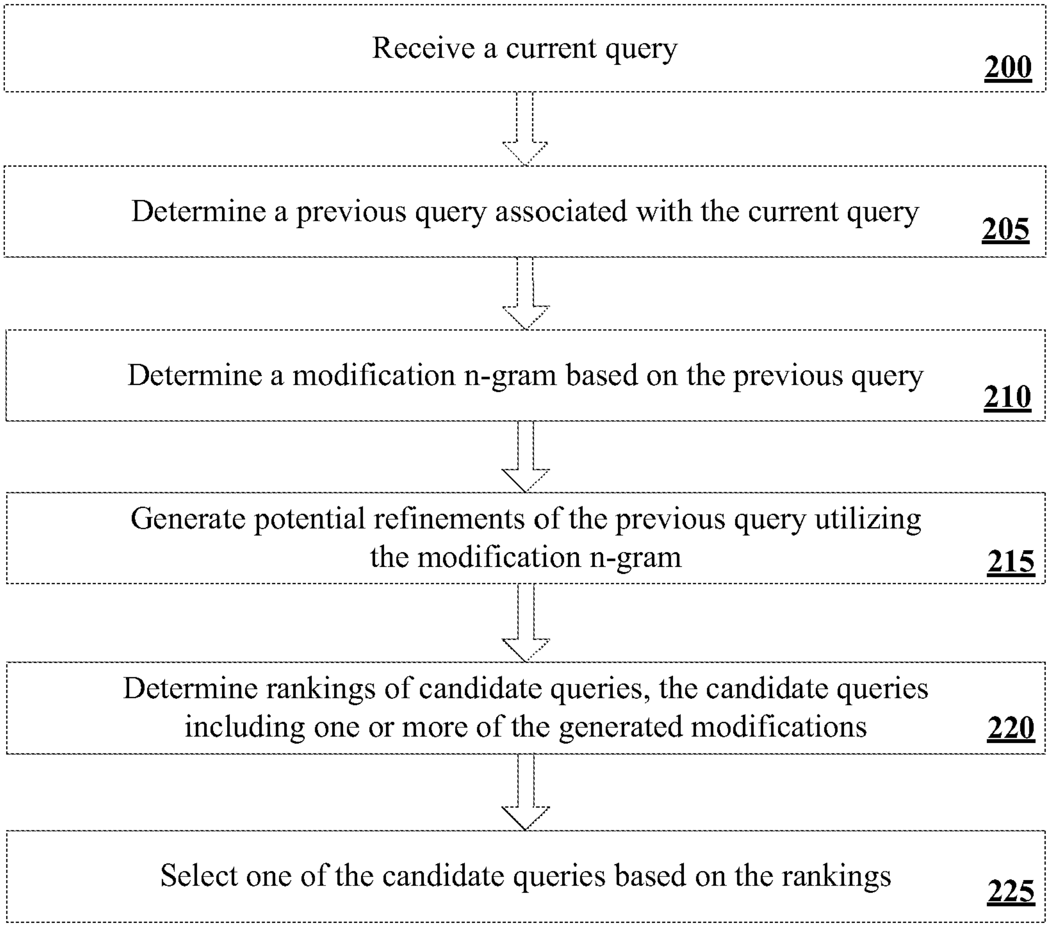
FIG. 2 is a flow chart illustrating an example method generating modifications of a previous query based on a current query issued subsequent to the previous query, determining rankings of the modifications and/or the current query, and selecting at least one of the modifications and/or the current query, based on the rankings, for submission in response to the current query.

FIG. 2 is a flow chart illustrating an example method of generating modifications of a previous query based on a current query issued subsequent to the previous query, determining rankings of the modifications and/or the current query, and selecting at least one of the modifications and/or the current query, based on the rankings, for submission in response to the current query. Other implementations may perform the steps in a different order, omit certain steps, and/or perform different and/or additional steps than those illustrated in FIG. 2. For convenience, aspects of FIG. 2 will be described with reference to a system of one or more computers that perform the process. The system may include, for example, one or more aspects of the query processing system 130 such as the refinement intent determination module 132 and/or the modification generation module 134 of FIG. 1.

At step 200, a current query is received. In some implementations the current query may be received by the query processing system 130 via client device 106. For example, the refinement intent determination module 132 may receive the current query. In some implementations the current query may be received by the query processing system 130 via content database 120 and/or other database. For example, the current query may be a past query in a record of past queries stored in content database 120. In some implementations the refinement intent determination module 132 may determine whether the current query is indicative of intent to refine a previous query associated with the current query. In some implementations whether a current query indicates intent to refine a previous query submitted by the user may be determined based on one or more of terms of the current query, one or more aspects of metadata optionally associated with the current query, and/or comparison of the current query to the past query (determined at step 205). In implementations in which it is determined whether the current query is indicative of intent to refine a previous query, one or more of steps 205-225 may be performed only if the current query is determined to be indicative of intent to refine a previous query.

At step 205, a previous query associated with the current query is identified. In some implementations the refinement generation module 134 may determine a previous query associated with the current query based on, for example, determining that both queries have been submitted by the same user, that both queries have been submitted by the same computing device issuing the current query, and/or that the previous query was submitted by another computing device associated with the computing device issuing the current query. In some implementations the previous query may be a query determined based on satisfaction of a query freshness threshold by the previous query relative to the current query. For example, the query freshness threshold may require that the previous query was submitted within a certain amount of queries of the current query.

At step 210, a modification n-gram is determined based on the previous query. In some implementations the modification generation module 134 may determine the modification n-gram by determining those terms of the query that are not part of a modification intent n-gram. For example, for a query [what about flowers], the term "flowers" may be determined to be the modification n-gram since it is the only term of the query that is not part of the modification intent n-gram "what about". In some implementations, step 210 may include determining multiple modification n-grams from the current query. For example, for the query [What about Korean in Manhattan] both "Korean" and "Manhattan" may be identified as modification n-grams. Steps of the method illustrated in FIG. 2 may be performed on each of the potential modification n-grams that are determined at step 210. For example, steps 215 and 220 may be performed with the potential modification n-gram "Korean", and steps 215 and 220 may be further performed with the potential modification n-gram "Manhattan".

At step 215, one or more modifications of the previous query are generated utilizing the modification n-gram. In some implementations the modification generation module 134 may generate multiple modifications of the previous query. Each modification of the previous query includes one or more modification n-grams of the current query substituted for one or more n-grams of the previous query. An example of modifications of a previous query utilizing modification n-grams from a current query is illustrated in FIG. 4.

At step 220, rankings of candidate queries are determined. The candidate queries include one or more of the generated modifications of step 215. As discussed herein, in some implementations the candidate queries may also include the current query received at step 200. In some implementations each ranking of a candidate query is based on one or more of a prior query popularity measure, a query pattern popularity measure, a related concept measure, a category measure, an atomic concept measure, a location measure, and/or a synonym measure. In some implementations the query ranking module 136 may determine the ranking for the candidate queries. In some implementations step 220 may include one or more of the steps of FIG. 3.

In some implementations, ranking of a candidate query includes determining sub-scores for the candidate query and determining an overall score based on the sub-scores. In some implementations, each of the sub-scores for the multiple candidate queries may be normalized across all modifications and/or the current query prior to determining the overall score. For example, all of the popularity scores for the modifications and the current query may be normalized so that the normalized popularity scores sum to one. In some implementations step 220 may include one or more aspects of the steps of FIG. 3.

At step 225, one of the candidate queries is selected based on the rankings determined at step 220. In some implementations the query ranking module 136 may select the candidate query with the highest ranking. The selected candidate query may be one of the modifications or the current query. For example, if the current query is the candidate query with the highest score, it may be selected. Also, for example, if one of the modifications is the candidate query with the highest score, it may be selected. In some implementations the query ranking module 136 may provide the selected query as a submission query to one or more query systems as a query. In some implementations the selected query may be provided to a search system such as search system 102.

Figure 3:
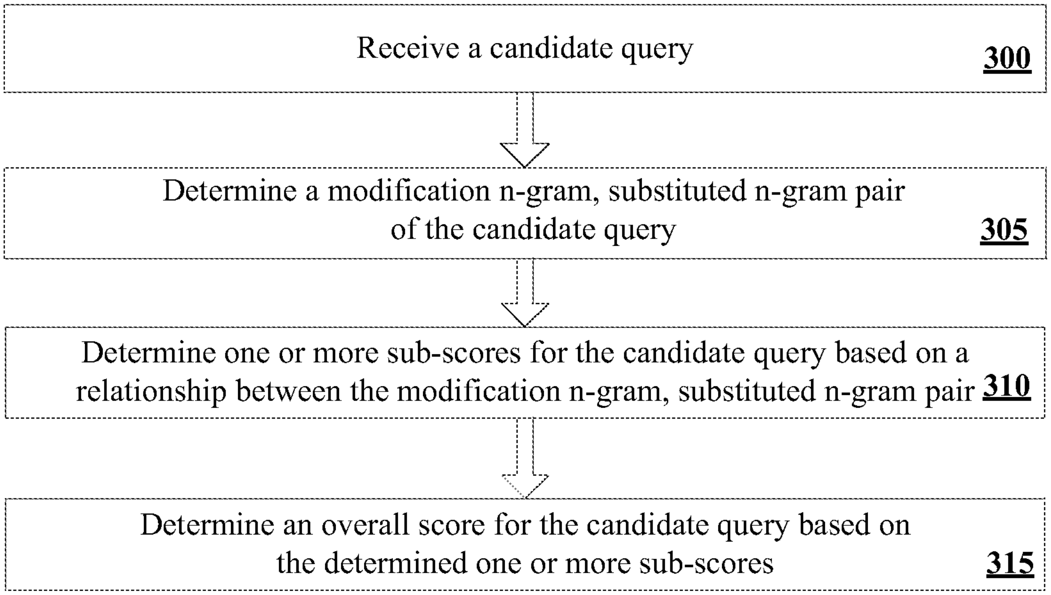
FIG. 3 is a flow chart illustrating an example method of determining a ranking of a candidate query.

FIG. 3 is a flow chart illustrating an example method of determining a ranking of a candidate query. Other implementations may perform the steps in a different order, omit certain steps, and/or perform different and/or additional steps than those illustrated in FIG. 3. For convenience, aspects of FIG. 3 will be described with reference to a system of one or more computers that perform the process. The system may include, for example, the modification generation module 134 and/or the query ranking module 136 of FIG. 1.

At step 300, a candidate query is received. The candidate query may include one or more of the generated modifications of step 215. As discussed herein, in some implementations the candidate query may also include the current query received at step 220. In some implementations the query ranking module 136 may receive the candidate query from the modification generation module 134.

At step 305, a modification n-gram, substituted n-gram pair of the candidate query is determined. For example, with reference to FIG. 5A, for the candidate query [tuesday tomorrow] formed by substituting the substituted n-gram "weather" of the previous query [weather tomorrow] with the modification n-gram "tuesday" of the current query [how about on Tuesday], the modification n-gram, substituted n-gram pair (tuesday, weather) may be determined. In some implementations the modification generation module 136 may determine the modification n-gram, substituted n-gram pair. For example, the modification generation module 136 may determine the modification n-gram, substituted n-gram pair in generating the candidate query and may provide an indication of the pair to the query ranking module 136 in combination with providing the candidate query.

At step 310, one or more sub-scores for the candidate query is determined based on a relationship between the modification n-gram, substituted n-gram pair of the candidate query. For example, each of a related concept score, a category score, a query signals score, and/or a number score may be based on a relationship between the modification n-gram, substituted n-gram pair of the candidate query. Each of such scores may optionally be based on one or more associated measures obtained for the modification n-gram, substituted n-gram pair of the candidate query and/or for other aspects of the candidate query. For example, the category score for a modification may be determined based on category measures for the modification n-gram, substituted n-gram pair. Also, for example, the query signals score may be based on an atomic concept measure for one or more n-grams of the modification and a determination as to how the modification n-gram, substituted n-gram pair affects any indivisible n-grams indicated by the atomic concept measure.

As discussed herein, when the candidate query is the current query, the modification n-gram, substituted n-gram pair may not indicate an n-gram pair, but may instead indicate a lack of an n-gram pair. In some of those implementations, one or more default scores for each of such sub-scores may be determined for the current query. Accordingly, a related concept score, a category score, a query signals score, and/or a number score may likewise be determined for the current query based on determining the modification n-gram, substituted n-gram pair of the current query indicates a lack of an n-gram pair.

At step 315 an overall score for the candidate query is determined based on the determined one or more sub-scores of step 310. In some implementations additional sub-scores may also be utilized in determining the overall score. For example, sub-scores of a prior query popularity score and a query pattern popularity score may also be utilized.

In some implementations, each of the sub-scores may be normalized across all candidate queries prior to determining the overall score. For example, all of the popularity scores for the candidate queries may be normalized so that the normalized popularity scores sum to one. In some implementations the overall score for a candidate query is based on combining all of the sub-scores for that candidate query. For example, the overall score for a modification may be based on multiplying all of the sub-scores together for that modification. In some implementations additional and/or alternative techniques for combining the sub-scores may be utilized. For example, a sum, a weighted average, a linear combination, and/or the P-mean of one or more of the sub-scores may be utilized. In some implementations, a boost is applied to the overall score of the current query. Such a boost may promote the score of the current query, thereby increasing the chance that a modification is utilized, either in lieu of or in addition to the current query, only when the user truly has modification intent.

Figure 6:
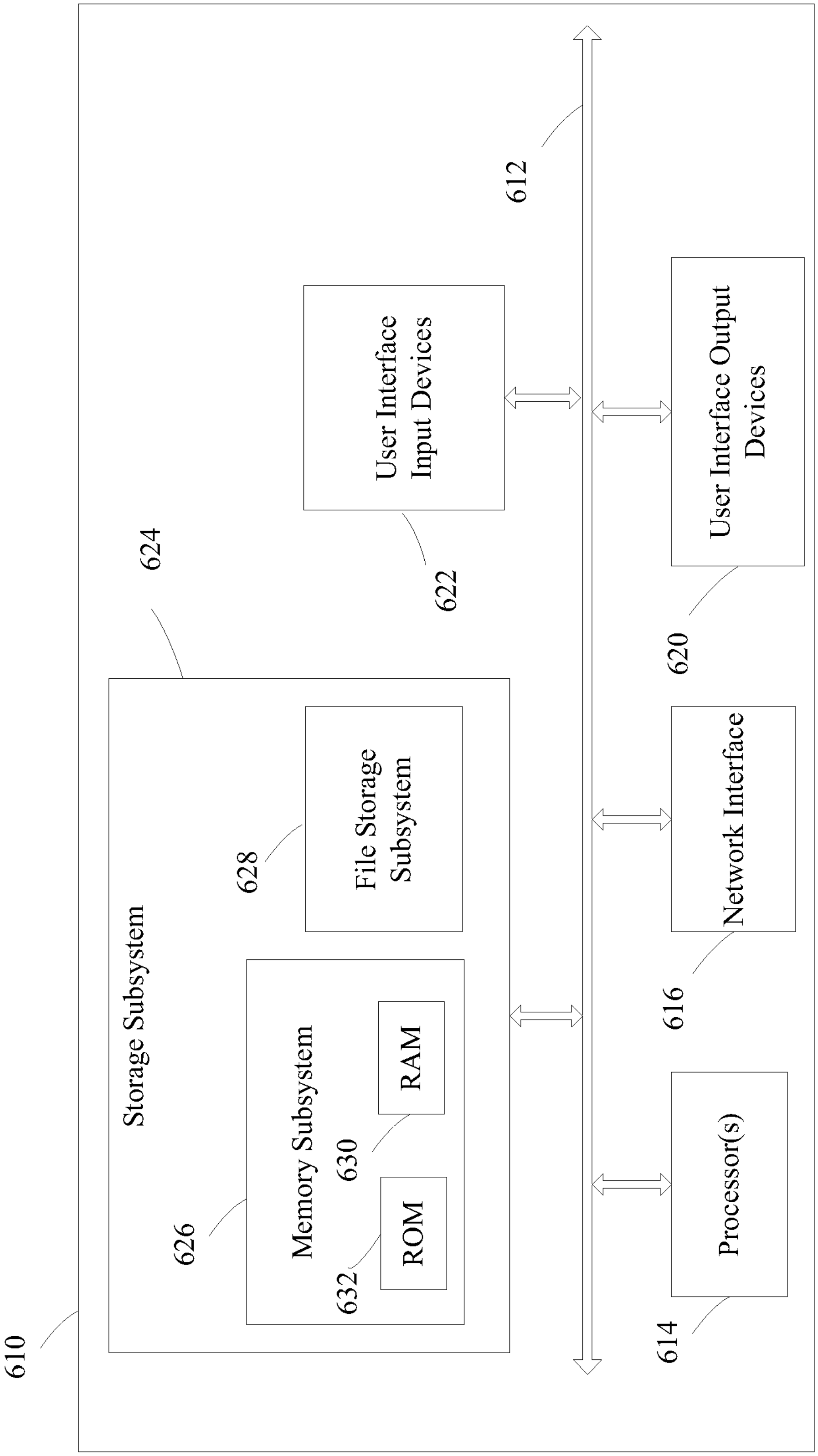
FIG. 6 illustrates an example architecture of a computer system.

FIG. 6 is a block diagram of an example computer system 610. Computer system 610 typically includes at least one processor 614 which communicates with a number of peripheral devices via bus subsystem 612. These peripheral devices may include a storage subsystem 624, including, for example, a memory subsystem 626 and a file storage subsystem 628, user interface input devices 622, user interface output devices 620, and a network interface subsystem 616. The input and output devices allow user interaction with computer system 610. Network interface subsystem 616 provides an interface to outside networks and is coupled to corresponding interface devices in other computer systems.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules described herein. For example, the storage subsystem 624 may include the logic to generate modifications of a previous query based on a current query issued subsequent to the previous query, determine rankings of the modifications and/or the current query, and select at least one of the modifications and/or the current query, based on the rankings, for submission in response to the current query.

These software modules are generally executed by processor 614 alone or in combination with other processors. Memory 626 used in the storage subsystem can include a number of memories including a main random access memory (RAM) 630 for storage of instructions and data during program execution and a read only memory (ROM) 632 in which fixed instructions are stored. A file storage subsystem 628 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 628 in the storage subsystem 624, or in other machines accessible by the processor(s) 614.

Bus subsystem 612 provides a mechanism for letting the various components and subsystems of computer system 610 communicate with each other as intended. Although bus subsystem 612 is shown schematically as a single bus, alternative implementations of the bus subsystem may use multiple busses.

Computer system 610 can be of varying types including a workstation, server, computing cluster, blade server, server farm, or any other data processing system or computing device. Due to the ever-changing nature of computers and networks, the description of computer system 610 depicted in FIG. 6 is intended only as a specific example for purposes of illustrating some implementations. Many other configurations of computer system 610 are possible having more or fewer components than the computer system depicted in FIG. 6.

While several inventive implementations have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive implementations described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive implementations described herein. It is, therefore, to be understood that the foregoing implementations are presented by way of example only and that, within the scope of the appended claims and equivalents thereto, inventive implementations may be practiced otherwise than as specifically described and claimed. Inventive implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over vocabulary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one implementation, to A only (optionally including elements other than B); in another implementation, to B only (optionally including elements other than A); in yet another implementation, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

"Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one implementation, to at least one, optionally including more than one, A, with no B present (and optionally including elements other than B); in another implementation, to at least one, optionally including more than one, B, with no A present (and optionally including elements other than A); in yet another implementation, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

What is claimed is:

1. A method implemented by one or more processors, the method comprising:

receiving, from a client device, an instance of a current query that includes a plurality of current query terms;

identifying a first recently submitted previous query, that was received from the client device, that includes a plurality of previous query terms and that was submitted prior to the instance of the current query;

in response to receiving the instance of the current query:

automatically submitting a first modification of the current query to a system and in lieu of submitting the current query to the system, wherein the first modification of the current query is generated based on the current query and the first recently submitted query;

in response to automatically submitting the first modification of the current query to the system and in lieu of submitting the current query to the system, receiving first responsive content that is responsive to the first modification of the current query; and in response to receiving the first responsive content that is responsive to the first modification of the current query, causing the first responsive content to be automatically provided for presentation via the client device;

receiving, from the client device or additional client device, an additional instance of the current query that includes the plurality of current query terms;

identifying a second recently submitted previous query, that was received from the client device or the additional client device, that includes a plurality of additional previous query terms and that was submitted prior to the additional instance of the current query, wherein the plurality of additional previous query terms, included in the second recently submitted previous query, differ from the plurality of additional previous query terms, included in the first recently submitted previous query; and in response to receiving the additional instance of the current query:

automatically submitting a second modification of the current query to the system and in lieu of submitting the current query to the system, wherein the second modification of the current query is generated based on the current query and the second recently submitted query, and wherein the second modification of the current query differs from the first modification of the current query;

in response to automatically submitting the second modification of the current query to the system and in lieu of submitting the current query to the system, receiving second responsive content that is responsive to the second modification of the current query, wherein the second responsive content that is responsive to the second modification of the current query differs from the first responsive content that is responsive to the first modification; and in response to receiving the additional instance of the current query and in response to receiving the second responsive content that is responsive to the second modification of the current query, causing the second responsive content to be automatically provided for presentation via the client device or the additional client device.

2. The method of claim 1, wherein identifying the first recently submitted previous query is based on the first recently submitted previous query being most recently submitted in time relative to the submission of the instance of current query.

3. The method of claim 1, wherein identifying the first recently submitted previous query is further based on the first recently submitted previous query being submitted within a threshold amount of time relative to the instance of the current query.

4. The method of claim 1, wherein identifying the second recently submitted previous query is based on the second recently submitted previous query being most recently submitted in time relative to the submission of the additional instance of current query.

5. The method of claim 4, wherein identifying the second recently submitted previous query is further based on the second recently submitted previous query being submitted within a threshold amount of time relative to the additional instance of the current query.

6. The method of claim 1, further comprising:

generating, based on substituting one or more of the plurality of current query terms with one or more of the plurality of previous query terms, a plurality of first modifications of the current query; and automatically selecting, based on a ranking of the plurality of first modifications of the current query, the first modification of the current query from among the plurality of first modifications of the current query.

7. The method of claim 6, further comprising:

generating, based on substituting one or more of the plurality of current query terms with one or more of the plurality of additional previous query terms, a plurality of second modifications of the current query; and automatically selecting, based on an additional ranking of the plurality of second modifications of the current query, the second modification of the current query from among the plurality of second modifications of the current query.

8. The method of claim 1, the operations further comprising:

generating, based on substituting one or more of the plurality of current query terms with one or more of the plurality of previous query terms, a plurality of first modifications of the current query;

automatically selecting, based on a ranking of the plurality of first modifications of the current query, the first modification of the current query from among the plurality of first modifications of the current query;

generating, based on substituting one or more of the plurality of current query terms with one or more of the plurality of additional previous query terms, a plurality of second modifications of the current query; and automatically selecting, based on an additional ranking of the plurality of second modifications of the current query, the second modification of the current query from among the plurality of second modifications of the current query.

9. A system, comprising:

at least one processor; and memory storing instructions that, when executed, cause the at least one processor to be operable to:

receive, from a client device, an instance of a current query that includes a plurality of current query terms;

identify a first recently submitted previous query, that was received from the client device, that includes a plurality of previous query terms and that was submitted prior to the instance of the current query;

in response to receiving the instance of the current query:

automatically submit a first modification of the current query to a system and in lieu of submitting the current query to the system, wherein the first modification of the current query is generated based on the current query and the first recently submitted query;

in response to automatically submitting the first modification of the current query to the system and in lieu of submitting the current query to the system, receive first responsive content that is responsive to the first modification of the current query; and in response to receiving the first responsive content that is responsive to the first modification of the current query, cause the first responsive content to be automatically provided for presentation via the client device;

receive, from the client device or additional client device, an additional instance of the current query that includes the plurality of current query terms;

identify a second recently submitted previous query, that was received from the client device or the additional client device, that includes a plurality of additional previous query terms and that was submitted prior to the additional instance of the current query, wherein the plurality of additional previous query terms, included in the second recently submitted previous query, differ from the plurality of additional previous query terms, included in the first recently submitted previous query; and in response to receiving the additional instance of the current query:

automatically submit a second modification of the current query to the system and in lieu of submitting the current query to the system, wherein the second modification of the current query is generated based on the current query and the second recently submitted query, and wherein the second modification of the current query differs from the first modification of the current query;

in response to automatically submitting the second modification of the current query to the system and in lieu of submitting the current query to the system, receive second responsive content that is responsive to the second modification of the current query, wherein the second responsive content that is responsive to the second modification of the current query differs from the first responsive content that is responsive to the first modification; and in response to receiving the additional instance of the current query and in response to receiving the second responsive content that is responsive to the second modification of the current query, cause the second responsive content to be automatically provided for presentation via the client device or the additional client device.

10. The system of claim 9, wherein identifying the first recently submitted previous query is based on the first recently submitted previous query being most recently submitted in time relative to the submission of the instance of current query.

11. The system of claim 10, wherein identifying the first recently submitted previous query is further based on the first recently submitted previous query being submitted within a threshold amount of time relative to the instance of the current query.

12. The system of claim 9, wherein identifying the second recently submitted previous query is based on the second recently submitted previous query being most recently submitted in time relative to the submission of the additional instance of current query.

13. The system of claim 12, wherein identifying the second recently submitted previous query is further based on the second recently submitted previous query being submitted within a threshold amount of time relative to the additional instance of the current query.

14. The system of claim 9, wherein the at least one processor is further operable to:

generate, based on substituting one or more of the plurality of current query terms with one or more of the plurality of previous query terms, a plurality of first modifications of the current query; and automatically select, based on a ranking of the plurality of first modifications of the current query, the first modification of the current query from among the plurality of first modifications of the current query.

15. The system of claim 14, wherein the at least one processor is further operable to:

generate, based on substituting one or more of the plurality of current query terms with one or more of the plurality of additional previous query terms, a plurality of second modifications of the current query; and automatically select, based on an additional ranking of the plurality of second modifications of the current query, the second modification of the current query from among the plurality of second modifications of the current query.

16. A non-transitory computer-readable storage medium storing instructions that, when executed, cause the at least one processor to be operable to perform operations, the operations comprising:

receiving, from a client device, an instance of a current query that includes a plurality of current query terms;

identifying a first recently submitted previous query, that was received from the client device, that includes a plurality of previous query terms and that was submitted prior to the instance of the current query;

in response to receiving the instance of the current query:

automatically submitting a first modification of the current query to a system and in lieu of submitting the current query to the system, wherein the first modification of the current query is generated based on the current query and the first recently submitted query;

in response to automatically submitting the first modification of the current query to the system and in lieu of submitting the current query to the system, receiving first responsive content that is responsive to the first modification of the current query; and in response to receiving the first responsive content that is responsive to the first modification of the current query, causing the first responsive content to be automatically provided for presentation via the client device;

receiving, from the client device or additional client device, an additional instance of the current query that includes the plurality of current query terms;

identifying a second recently submitted previous query, that was received from the client device or the additional client device, that includes a plurality of additional previous query terms and that was submitted prior to the additional instance of the current query, wherein the plurality of additional previous query terms, included in the second recently submitted previous query, differ from the plurality of additional previous query terms, included in the first recently submitted previous query; and in response to receiving the additional instance of the current query:

automatically submitting a second modification of the current query to the system and in lieu of submitting the current query to the system, wherein the second modification of the current query is generated based on the current query and the second recently submitted query, and wherein the second modification of the current query differs from the first modification of the current query;

in response to automatically submitting the second modification of the current query to the system and in lieu of submitting the current query to the system, receiving second responsive content that is responsive to the second modification of the current query, wherein the second responsive content that is responsive to the second modification of the current query differs from the first responsive content that is responsive to the first modification; and in response to receiving the additional instance of the current query and in response to receiving the second responsive content that is responsive to the second modification of the current query, causing the second responsive content to be automatically provided for presentation via the client device or the additional client device.

17. The non-transitory computer-readable storage medium of claim 16, wherein identifying the first recently submitted previous query is based on the first recently submitted previous query being most recently submitted in time relative to the submission of the instance of current query.

18. The non-transitory computer-readable storage medium of claim 17, wherein identifying the first recently submitted previous query is further based on the first recently submitted previous query being submitted within a threshold amount of time relative to the instance of the current query.

19. The non-transitory computer-readable storage medium of claim 16, wherein identifying the second recently submitted previous query is based on the second recently submitted previous query being most recently submitted in time relative to the submission of the additional instance of current query.

20. The non-transitory computer-readable storage medium of claim 19, wherein identifying the second recently submitted previous query is further based on the second recently submitted previous query being submitted within a threshold amount of time relative to the additional instance of the current query.

* * * * *